W. D'A. RYAN.
DEVICE FOR LIGHTING SMUDGE POTS.
APPLICATION FILED FEB. 15, 1919.
1,405,011.
Patented Jan. 31, 1922.
6 SHEETS—SHEET 1.
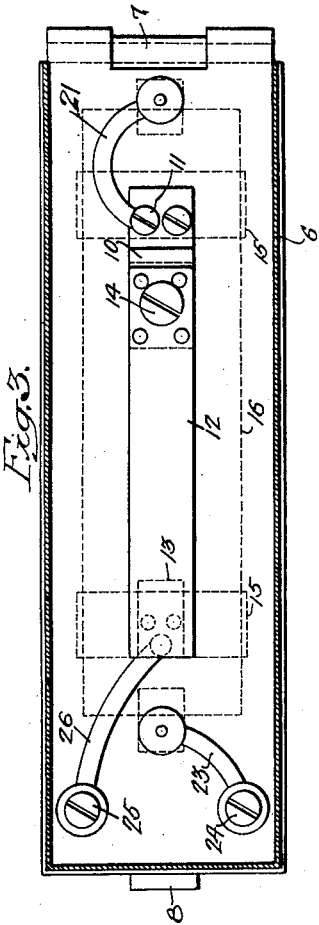
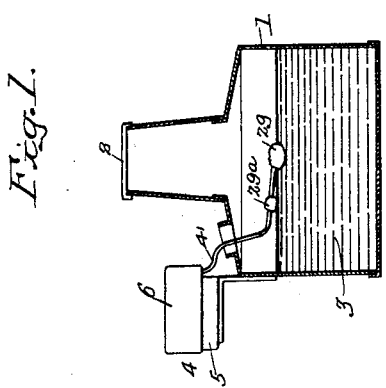
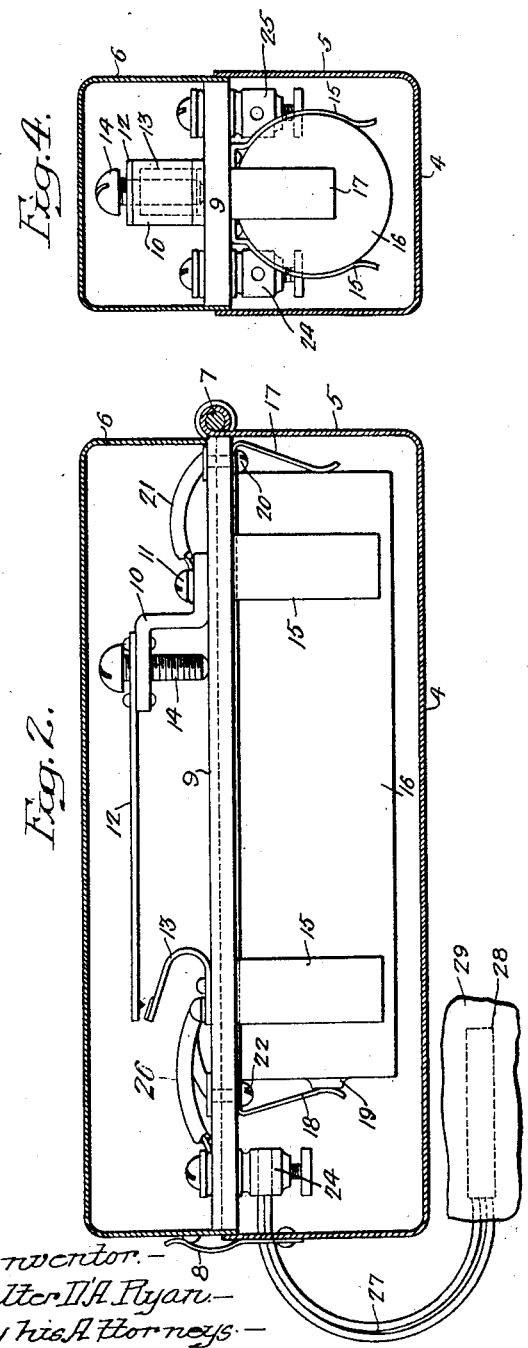
Inventor.—
Walter D'A. Ryan—
by his Attorneys—
Howson & Howson

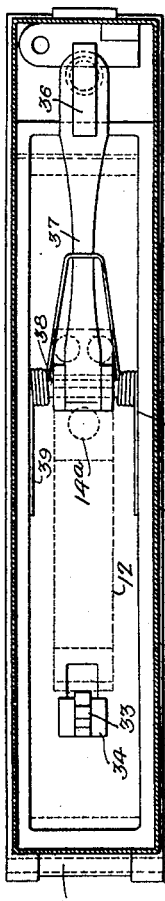

W. D'A. RYAN.
DEVICE FOR LIGHTING SMUDGE POTS.
APPLICATION FILED FEB. 15, 1919.
1,405,011.
Patented Jan. 31, 1922.
6 SHEETS—SHEET 3.
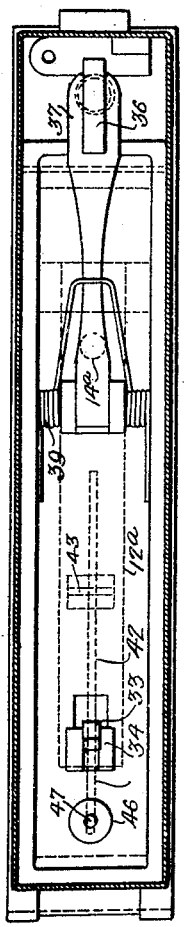
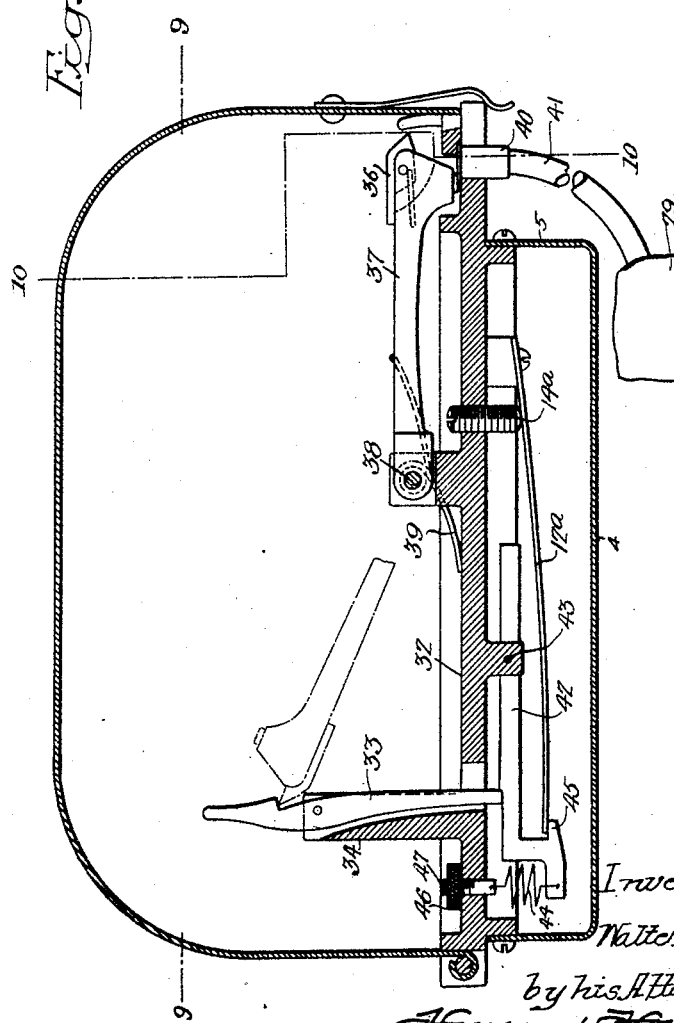

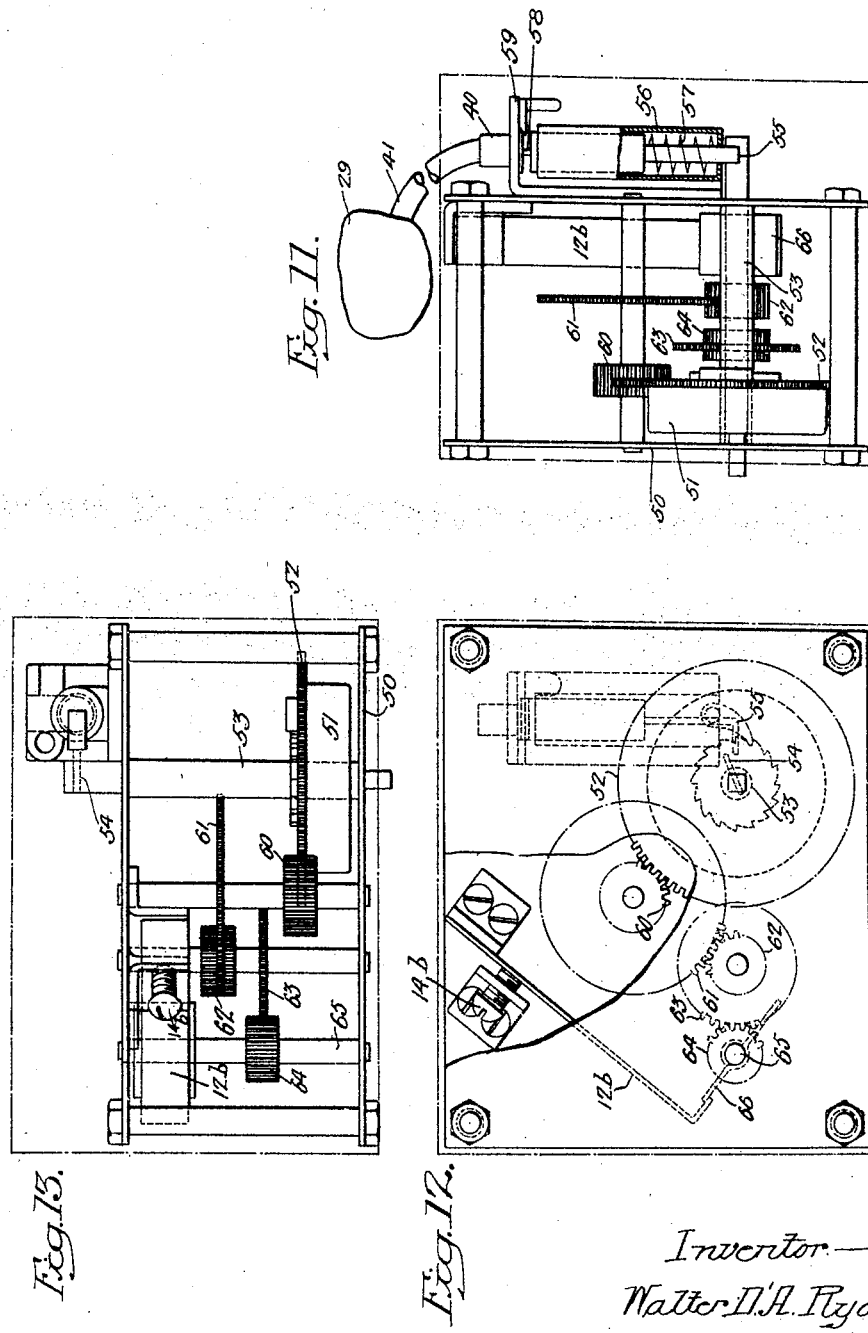

W. D'A. RYAN.
DEVICE FOR LIGHTING SMUDGE POTS.
APPLICATION FILED FEB. 15, 1919.
1,405,011.
Patented Jan. 31, 1922.
6 SHEETS—SHEET 5.
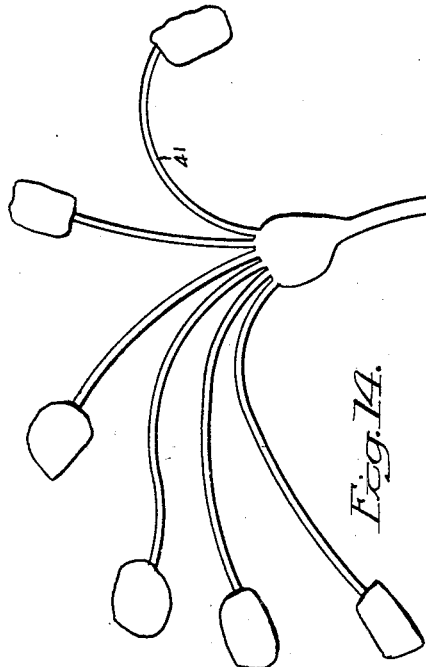
Fig. 14.
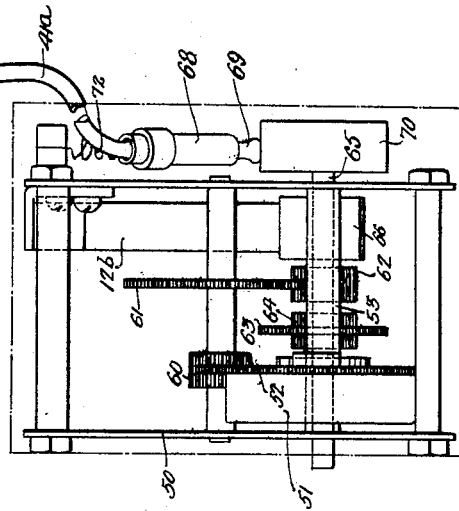
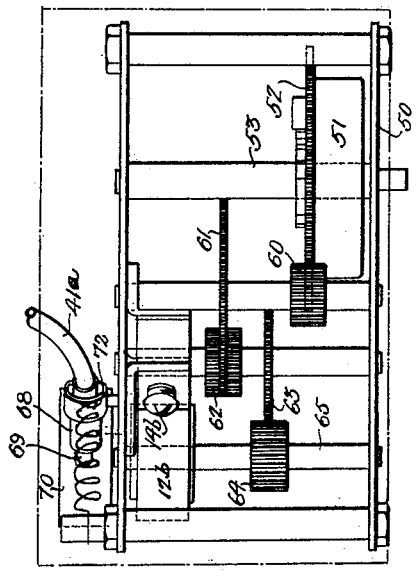
Fig. 16.
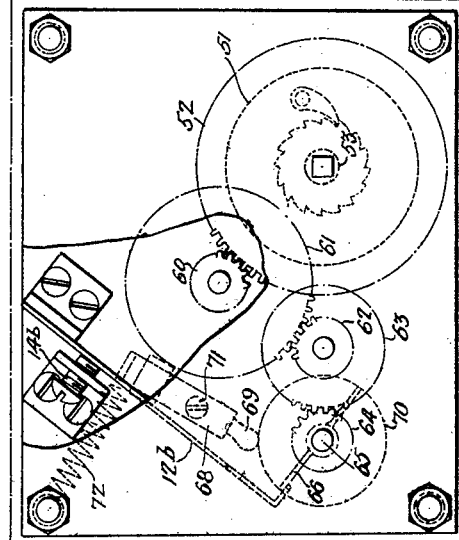
Fig. 15.
Inventor.—
Walter D'A Ryan.
by his Attorneys—
Howson & Howson

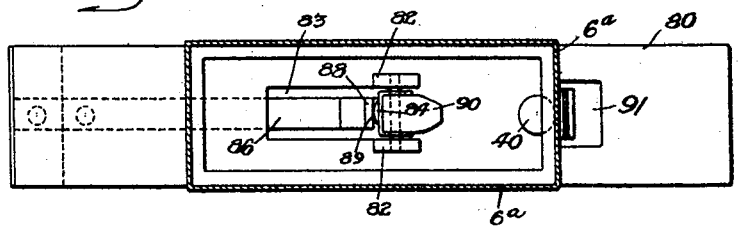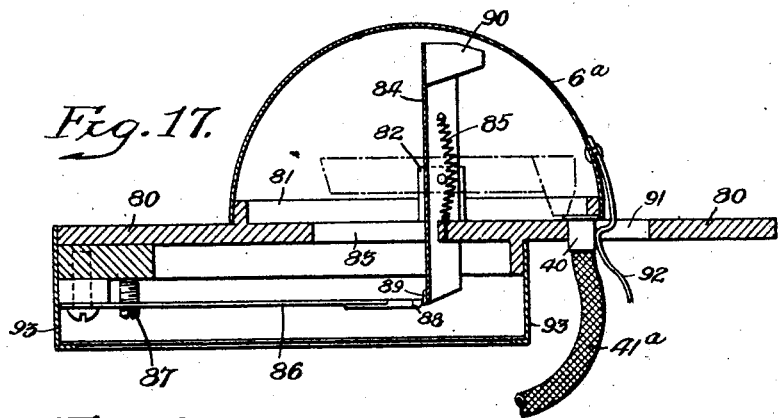

UNITED STATES PATENT OFFICE.

WALTER D'A. RYAN, OF SCHENECTADY, NEW YORK.

DEVICE FOR LIGHTING SMUDGE POTS.

1,405,011.      Specification of Letters Patent.      Patented Jan. 31, 1922.

Application filed February 15, 1919. Serial No. 277,234.

*To all whom it may concern:*

Be it known that I, WALTER D'A. RYAN, a subject of the King of Great Britain and Ireland and the Isle of Man, (having declared my intention of becoming a citizen of the United States,) residing in Schenectady, New York, have invented Devices for Lighting Smudge Pots, of which the following is a specification.

One object of my invention is to provide substantial and reliable temperature-controlled apparatus for automatically lighting or firing the heaters or smudge pots commonly employed for heating orchards at times when the temperature drops below a predetermined point, the invention more particularly contemplating novel means for insuring the ignition of the crude oil ordinarily employed as the fuel in such heaters.

It is further desired to provide novel means for causing a fuse or equivalent device to be ignited when the temperature falls to a predetermined point, together with means ignited by such device which shall insure the raising of a body of crude or other oil to the flashing point.

I also desire to provide a novel form of thermostatically-controlled, fuse igniting apparatus which shall be certain in action, conveniently adjustable to permit of the regulation of the temperature at which it operates, and of such a nature that it will not easily get out of order.

These objects and other advantageous ends I attain as hereinafter set forth, reference being had to the accompanying drawings, in which, Fig. 1 is a side elevation partly in section, illustrating one form of my invention applied to a smudge pot or heater;

Figs. 2, 3 and 4 are respectively a side elevation, a plan and an end elevation of that form of thermostatic igniting device shown in connection with the heater illustrated in Fig. 1;

Fig. 5 is a central longitudinal vertical section of a mechanically actuated form of igniting device embodying my invention;

Figs. 6 and 7 are sections on the lines 6—6 and 7—7 Fig. 5;

Fig. 8 is a longitudinal vertical section of a slightly modified form of my mechanically operated igniting device;

Figs. 9 and 10 are sections taken respectively on the lines 9—9 and 10—10, Fig. 8;

Fig. 11 is an end elevation, partly in section of another mechanically operated form of the invention;

Figs. 12 and 13 are a side elevation and a plan respectively of the apparatus shown in Fig. 11;

Figs. 14 and 15 are an end and a side elevation respectively of another modification;

Fig. 16 is a plan of the device shown in Figs. 14 and 15;

Figs. 17 and 18 are respectively a longitudinal vertical section and a plan of a simple form of the temperature responsive igniting device; and Fig. 19 is a longitudinal vertical section showing the device of Figs. 17 and 18 as equipped with a firing relay, and with its parts in their cartridge-exploding positions.

Referring to Figs. 1 to 4 inclusive of the above drawings, 1 represents a suitable container such as a metal or stoneware pot filled with a body of crude oil or other suitable fuel 3 and having a cover 2 which may be of water-proof paper so as to be burnt away when the pot is fired, though it may be of other material free from or attached to said pot in any desired manner. According to my invention I place adjacent this container a casing 4 made in two parts 5 and 6 hinged together at one end as indicated at 7 and provided with a spring case 8 at the opposite end whereby they are normally held together.

Rigidly held in the upper part 6 of the casing is an insulating plate or slab 9 having mounted on its upper face a thermostat shown as consisting of a stiff Z-shaped metallic strip 10 one end of which is fastened to the plate 9 by a screw 11. The opposite end of said strip has fixed to and projecting from it a metallic bar 12 usually of a composite nature and of such a design that it changes its shape in accordance with its immediate vicinity. Also fixed rigidly to the plate 9 is a U-shaped metal member 13 so mounted that while one of its arms is parallel and in engagement with said plate, its opposite arm extends immediately adjacent the free end of the strip 12 which with it is provided with suitable unoxidizable contacts.

The free arm of the member 10 carrying the thermostat strip 12 has mounted in it an adjusting screw 14 which extends into engagement with the plate 9 so as to cause variation in distance between the contact points of the members 12 and 13 as it is set up or backed off.

On the under face of the plate 9 are mounted two pairs of circularly curved spring clips 15 designed to removably receive an elongated cylindrical dry cell 16, there being also mounted on the under side of the plate two spring contact strips 17 and 18 of which the first yieldingly engages the metallic base of the cell 16 and the other the central terminal 19 at what is customarily the top or upper end of said cell. The screw or rivet 20 by which the spring contact 17 is held to the plate 9 is connected by a suitable conductor 21 with the binding screw 11 and hence with the thermostatic bar 12, while the second spring contact 18 is connected by a screw or rivet 22 to one end of a conductor 23 whose second end is connected to a terminal binding post 24 projecting downwardly from the under side of the plate 9 immediately adjacent this binding post. At the same end of the insulating base is a second terminal 25 connected by a conductor 26 with the U-shaped terminal 13.

The lower member 5 of the container 4 has its upper edge recessed or notched immediately adjacent the two terminals 24 and 25 to permit of the passage of a pair of conductors which in the form of a cable 27 run to an electrically fired cartridge 28 imbedded in a fire ball 29 immersed in or supported upon the body of fuel 3 in the heater pot 1.

With the above described arrangement of parts the thermostatic bar 12 is normally disengaged from the fixed contact 13 but is so adjusted by means of the screw 14 that when the temperature of the air in the container 4 (which may be provided with suitable openings to allow of free circulation) falls to a predetermined temperature such as 28° F., said bar will so change its shape that its free end will come into engagement with the contact 13. As a result a circuit will be completed from the terminal 19 of the cell 16 through the contact strip 18, conductor 23, terminal 24, cable 27, cartridge 28 and back to the terminal 25, thence through conductor 26 to contact 13, thermostatic bar 12—10, conductor 21 and contact spring 17 to the second terminal of the cell 16. As a consequence the cartridge 28 is fired and is thereby caused to ignite the fire ball 29 which is composed of some highly combustible material such as oil soaked cotton waste or other suitable substance. This latter by reason of the intensity of the heat generated will shortly raise the temperature of the oil in its vicinity to the flashing point and will ignite it, thereby putting the heater into operation as desired. Obviously the cartridge 28 may be of such design and material as to generate sufficient gas at the time of its ignition to forcibly remove the cover 2 of the fire pot, or if it is of paper, to ignite and burn it away.

If for any reason it should be found disadvantageous to employ an electrical system such as that illustrated in Figs. 2 to 4 inclusive for causing ignition of the fire ball when the thermostatic bar occupies a certain position by reason of the fall of temperature, I may employ a mechanical device such as that illustrated in Figs. 5 to 7 inclusive.

In this case I provide a container having an upper part 30 and a lower part 31, of which the former is hinged and the latter is removably held as by screws, to a rigid base plate 32. On said plate is mounted a thermostatic bar 10—12 adjustable as before by means of a screw 14$^a$, but in this case having its free end formed to engage a notch in the end of the long arm of a trigger lever 33 pivoted to a suitable projecting lug 34 of the base plate. The short arm of this lever is formed with a notch 35 designed for the reception of a latch 36 mounted on the free end of a hammer 37 pivoted at 38 to the base plate. Said hammer is normally acted on by a spring 39 so that it tends to turn on its pivot from a position in which it is held by the trigger lever 33 to the position shown in Fig. 5, wherein it will strike a cartridge 40 held in an opening of the base plate. From said cartridge 40 a fuse 41 extends to and is imbedded in a fire ball 29 designed as in the case of Fig. 1 to be placed in or upon the fuel in the heater or fire pot.

With this form of the invention a fall of the temperature to the predetermined point causes the free end of the thermostatic bar 12 to disengage the trigger lever 33, which is then free to turn on its pivot so as to release the hammer 37. This latter under the action of its spring 39 thereupon turns on its pivot 38 into the position shown in Fig. 5 in which it violently strikes the primer or rim of the cartridge 40, causing this to explode and ignite the fire ball 29 through the fuse 41. The intense heat resulting from the combustion of the material of the fire ball then ignites the oil or other fuel in the fire pot as before explained.

That form of my invention shown in Figs. 8 to 10 inclusive while being similar in many respects to that of Figs. 5 to 7, includes a second lever 42 between the thermostatic bar 12$^a$ and the trigger lever 33. This second lever is pivoted to the under side of the base plate 32 at 43 and in its upper edge has a notch for the reception of the end of the long arm of said trigger lever. That end of the lever 42 in which the notch is formed is normally acted on by a spring 44 so that it tends to move toward the trigger lever and it includes a finger 45 normally acted on by the thermostatic bar 12$^a$, the tension of the spring 44 being adjustable by means of a nut 46 threaded on the screw 47 whereby it is held to the base plate. The adjustment of the thermostatic bar is accomplished by means of a set screw 14ª mounted in the base plate and abutting against said bar adjacent its fixed end.

Under normal conditions the hammer 37 is retained in its set condition by the trigger lever 33 which in turn is prevented from moving on its pivot by reason of its engagement with the shoulder provided by the notch in the lever 42.

The screws 14ª and 47 are so adjusted that as long as the temperature remains above a predetermined point, the spring 44 holds the lever 42 against the end of the trigger lever 33, but when the temperature drops below this point, the pressure exerted by the thermostatic bar 12ª on the finger 45 of the lever 42 turns this on its pivot or fulcrum 43 against the action of the spring 44 so that it releases the trigger lever which in turn releases the hammer 37. This latter, under the influence of its spring 39, is then swung on its pivot 38 into engagement with the fuse igniting cartridge 40 which as in the case shown in Fig. 5, upon being ignited in turn ignites the fire ball 29.

In that form of the invention shown in Figs. 11 to 13 I provide a clock mechanism mounted on a frame 50 within a suitable container and including a spring of the well known type mounted in a spring case 51 in such manner as to drive a main gear wheel 52. This gear wheel is fixed to a main shaft 53 having also fixed to it a projecting arm 54 which when the gear wheel is turned is brought into engagement with the overhung end of a plunger rod 55 guided in a cylindrical structure 56 and normally held by a spring 57 with a firing pin 58 resting upon the fuse igniting cartridge 40 which is suitably supported on the bar or frame structure 59. The main gear wheel 52 through a train of gears 60—64 is operatively connected to a spindle 65 on which is mounted a butterfly governor 66 of the well known form and held from rotation under the action of the main spring by the turned over free end of the thermostatic bar 12ᵇ. The opposite end of said bar is suitably fixed to the supporting frame and is adjustable by a set screw 14ᵇ.

Under conditions of use the main spring is maintained under tension and as long as the temperature remains above the predetermined point the thermostatic bar 12ᵇ engages and holds the butterfly governor 66 from turning. When however, the temperature falls sufficiently said bar bends or assumes such a form as to cause it to disengage the blade of the governor 66 which thereupon turns and with it the main gear wheel 52 and the shaft 53. The arm 54 on the latter thereupon engages the turned over end of the plunger rod 55, moving it with the firing pin 58 longitudinally of its guiding cylinder 56 against the action of the spring 57, until such time as continued turning of said shaft permits said arm 54 to release the rod. The latter thereupon moves in its guideway 56 under the action of the spring 57 and its firing pin strikes and explodes the cartridge 40 which thereupon ignites the fuse 41 and the fire ball 29 as previously explained.

That form of the invention shown in Figs. 14 to 16 is similar to that just described except that the fuse 41 is extended into one end of a holder 68 from whose opposite end projects a friction ignited member 69 so held by a spring 72 as to normally rest upon the roughened surface of a wheel 70 fixed to the spindle 65 carrying the butterfly governor 66. When this latter is released by the thermostatic bar 12ᵇ as previously described, the rapid revolution of the rough surfaced wheel 70 under the action of the main spring causes ignition of the head of the match 69 which is yieldingly pressed toward said wheel 70 by its pivotally mounted holder 68 under the action of the spring 72. The resulting ignition of the match fires the fuse 41 which as before ignites the fire ball.

Figs. 17 and 18 show the temperature responsive igniting device as consisting of an elongated base plate 80 having an upwardly projecting flange 81 surrounding an elongated area in which are two upwardly projecting lugs 82 and an elongated slot 83. A bar 84 preferably of channel section, is pivoted to the lugs 82 and has extending within it a spring 85, one end of which is connected to the base plate while its second end is attached to said bar adjacent one end; the arrangement being such that said spring tends to forcibly move it from a position substantially perpendicular to the base plate into a position parallel thereto. In moving from one of its extreme positions to another, one end of the bar 84 passes through the slot 83 and it may be retained in its perpendicular position by the thermostatic bar 86, one end of which is fixed to the under side of the base plate 80 adjacent one end thereof while its second end projects substantially parallel to said plate into a position to engage one end of the bar 84. For regulating the point at which the thermostatic bar 86 engages the hammer bar 84, I mount in the former an adjusting screw 87 and in order to reduce to a minimum the friction between said two bars, provide them respectively with non-corrodible bearing plates or points 88 and 89 having the greatest possible hardness. Glass or non-corrosive metal or alloy will give suitable results though it is essential that its nature be such as to reduce the friction to a minimum. The second end of the hammer bar 84 has a firing head 90 and the base plate is formed with a recess 91 positioned to hold a cartridge 40 which as before explained is mounted on or operatively connected to a fuse 41ª. In this form of the invention, a cover 6ª fits around the flange 81 so as to enclose the hammer and it carries a spring latch 92 so placed as to retain the cartridge 40 in its recess. A casing 93 depending from the under face of the base plate, encloses the thermostatic bar and preferably has an opening in its bottom face to permit of inspection and adjustment of said bar.

As in the other forms of my invention, a predetermined fall in temperature results in such a change in form and position of the thermostatic bar 86 as to cause its free end to disengage the lower end of the hammer bar 84, which is then free to turn on its pivot under the action of its spring 85. As a result its head 90 strikes the cartridge 40 and fires the fuse and fire ball as heretofore explained. Obviously the raising of the cover 6ª releases the fired cartridge and permits the bar 84 to be moved from a position parallel with the base plate to one at right angles thereto, in which it is retained by the thermostatic bar as long as the temperature remains above the predetermined low point. After a new cartridge has been put in place it is retained in its recess by the spring latch of the cover.

In case it should be desired to increase the force of the blow by which the cartridge is exploded, I may construct the apparatus substantially as shown in Figs. 17 and 18 but add to it the mechanical relay attachment illustrated in Fig. 19. For this purpose the pivoted bar 84ª is placed to be capable of striking and releasing a trigger 95 pivoted on the base plate 80ª and normally forced upward by a spring 96. Above this trigger or relay trip is pivoted a firing hammer 97 having a projection 98 whereby it may be held in a raised position by the trigger, the recess 91 for the cartridge 40 being so placed that the latter will be struck by the hammer when this has been released from the trigger and caused to turn on its pivot under the action of a spring 99.

In setting this form of my invention the bar 84ª is turned on its pivot against the action of its spring 85 until its hardened tip 89 engages the correspondingly hardened tip of the thermostatic bar 86, whereby it is retained in a substantially vertical position. The firing hammer is then swung upwardly on its pivot against the action of the relatively powerful spring 99 until its projection 98 is engaged and held by the trigger 95, after which the cartridge 40 is inserted and maintained in place as previously described.

Upon the operation of the thermostat due to a predetermined fall of temperature, the bar 84ª is released and caused to turn on its pivot until its head violently strikes the trigger 95. As a result this is swung downwardly on its pivot to an extent sufficient to release the projection 98 of the firing hammer, which thereupon is turned on its pivot under the action of the spring 99 and is brought into violent engagement with the cartridge 40. This is thereupon exploded with the results heretofore noted;—it being understood that this form of the invention possesses the advantage of permitting a comparatively weak spring 85 to be employed for the bar 84ª so that this is easily disengaged by the thermostat with but little friction and likewise allowing the relatively strong spring 99 to be used on the firing hammer so that the cartridge is certainly exploded.

From the above description it will be noted that I have provided a thermostatically controlled mechanism whereby the ignition of a fire ball placed in a body of liquid or other fuel in the heater is assured whenever the temperature in its vicinity falls to a predetermined point;—the ignition of the fire ball being in most cases accomplished through the medium of a fuse connecting it with a cartridge whose explosion or ignition is directly controlled by a thermostatic bar.

By the term fire ball I desire to include such a member or device intermediate the fuel in the heater and the primer or fuse ignited by the action of the thermostat, as will make possible a sustained heating of said fuel sufficient to raise its temperature (in the case of oil) to the flashing point or otherwise make certain its catching fire and the putting into operation of the heater or smudge pot.

If it is desired or found advisable, I may employ a cover-removing charge enclosed in a package or cartridge 29ª and suitably associated with the fuse 41 so as to be ignited thereby when the cartridge 40 or its equivalent is fired;—the arrangement being such that the explosion of this charge fires or blows off the cover of the smudge pot shortly before the fire ball 29 is ignited.

Under certain conditions where a number of smudge pots are arranged comparatively close together, I may so arrange my invention that they all may be ignited from a single thermostatic controlling device. For this purpose the cartridge 40 or its equivalent is arranged to fire the main fuse 41ª and this is so connected as to simultaneously ignite any desired number of fuses 41 thereby causing ignition of the fire balls in the several smudge pots to which they lead.

I claim:

1. The combination of a supporting structure including means for holding a cartridge; a spring actuated lever fulcrumed on said structure and having a head at one end for striking the cartridge; with a thermostatic bar adjustably held at one end to said supporting structure and having its other end projected to releasably engage the second end of the lever, said bar being free to change its shape and release said trigger under predetermined temperature conditions.

2. The combination of a base plate having a slot and including means for holding a cartridge; a lever operative through the slot and having a head positioned to strike the cartridge; a spring operative on the lever to move its head into engagement with the cartridge; with a thermostat having a portion directly operative on the lever to releasably retain it in a set position.

3. The combination of a base plate having a slot and including means for holding a cartridge; a lever operative through the slot and having a head positioned to strike the cartridge; a spring operative on the lever to move its head into engagement with the cartridge; a thermostat having a portion directly operative on the lever to releasably retain it in a set position; with a cover for said device including a portion normally holding the cartridge in place.

In witness whereof I affix my signature.

WALTER D'A. RYAN.